United States Patent
Jakoby et al.

(10) Patent No.: US 10,629,973 B2
(45) Date of Patent: *Apr. 21, 2020

(54) PHASE SHIFT DEVICE

(71) Applicant: ALCAN Systems GmbH, Darmstadt (DE)

(72) Inventors: Rolf Jakoby, Rosbach (DE); Onur Hamza Karabey, Neu-Isenburg (DE); Wenjuan Hu, Darmstadt (DE)

(73) Assignee: ALCAN Systems GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,570

(22) Filed: Nov. 20, 2018

(65) Prior Publication Data
US 2019/0103644 A1    Apr. 4, 2019

Related U.S. Application Data

(63) Continuation of application No. 14/767,131, filed as application No. PCT/EP2014/052964 on Feb. 14, 2014, now Pat. No. 10,141,620, application No. 16/196,570, which is a continuation of application No. 14/767,131, filed on Aug. 11, 2015, now Pat. No. 10,141,620.

(30) Foreign Application Priority Data

Feb. 15, 2013   (EP) ..................... 13155432

(51) Int. Cl.
*H01P 1/18*   (2006.01)
*H01Q 9/04*   (2006.01)
*H01Q 13/10*  (2006.01)
*H01G 7/06*   (2006.01)

(52) U.S. Cl.
CPC ............. *H01P 1/184* (2013.01); *H01G 7/06* (2013.01); *H01P 1/181* (2013.01); *H01Q 9/0407* (2013.01); *H01Q 9/0457* (2013.01); *H01Q 13/106* (2013.01)

(58) Field of Classification Search
CPC .... H01P 1/18; H01P 1/184; H01P 9/00; H01P 3/08; H01P 3/081; H01P 1/181; H01Q 9/0457; H01Q 9/0407; H01Q 13/106; H01G 7/06
USPC ................. 333/156, 161, 164, 246
See application file for complete search history.

(56) References Cited

U.S. PATENT DOCUMENTS

| 5,936,484 A | * | 8/1999 | Dolfi ................. H01Q 3/36 333/156 |
| 10,141,620 B2 | * | 11/2018 | Jakoby .............. H01P 1/181 |
| 2012/0075154 A1 | * | 3/2012 | Biglarbegian ....... H01Q 13/106 343/770 |

* cited by examiner

*Primary Examiner* — Rakesh B Patel
*Assistant Examiner* — Jorge L Salazar, Jr.
(74) *Attorney, Agent, or Firm* — WRB-IP LLP

(57) ABSTRACT

A phase shift device includes a planar transmission line that is formed by a signal electrode and a ground electrode which are separated by a dielectric substance, whereby the signal electrode of the planar transmission line is divided into several pieces and includes overlapping areas of adjacent pieces that are filled with a tunable liquid crystal material, thereby forming a dielectric tunable component (varactor) with a metal-insulator-metal type capacitor. The several pieces of the signal electrode are arranged at two or more different distance levels with respect to the ground electrode. The tunable liquid crystal material is arranged as a continuous layer between several pieces of the signal electrode that are arranged at two different distance levels.

16 Claims, 6 Drawing Sheets

PHASE SHIFT DEVICE

The present application is a continuation of U.S. application Ser. No. 14/767,151, filed Aug. 11, 2015, which is the U.S. national stage of International App. PCT/EP2014/052964, filed Feb. 14, 2014, which claims priority to European App. EP 13155432.1, filed Feb. 15, 2013, all of which are incorporated by reference.

BACKGROUND AND SUMMARY

The present invention relates a phase shift device with at least one tunable component. This phase shift is frequency independent (phase shifter) or frequency dependent (variable delay-line).

The shortage in the available frequency spectrum for radio communications and the requirement for more functionality in smaller volume increase the demand for reconfigurable components. Hereinafter radio frequency (RF) is meant a rate of oscillation in the range of about 3 kHz to 300 GHz, which corresponds to the frequency of radio waves and of the alternating currents which carry and transmit radio signals. Depending on the device requirements there are different possible solutions for phase shift devices like e.g. semiconductors, MEMS or tunable dielectrics to design agile RF components.

Phase shift devices are one of the key elements for reconfigurable electronic beam steering antennas.

From the state of the art the following documents are cited as examples of the above mentioned phase shift devices:
1. [0000] U.S. Pat. No. 8,305,259 B2
2. U.S. Pat. No. 8,022,861 B2
3. U.S. Pat. No. 8,013,688 B2
4. PCT patent application WO 2012/123072 A1
5. US patent application US 2009/0302976 A1
6. F. Goelden, A. Gaebler, M. Goebel, A. Manabe, S. Mueller, and R. Jakoby, "Tunable liquid crystal phase shifter for microwave frequencies," Electronics Letters, vol. 45, no. 13, pp. 686-687, 2009.
7. O. H. Karabey, F. Goelden, A. Gaebler, S. Strunck, and R. Jakoby, "Tunable 5 loaded line phase shifters for microwave applications," inProc. IEEE MTT-S Int. Microwave Symp. Digest (MTT), 2011, pp. 1-4.
8. U.S. Pat. No. 5,936,484 A
9. Japanese patent application JP 2003/008310 A
10. Onur Hamza Karabey et al., "Continuously Polarization Agile Antenna by Using Liquid Crystal-Based Tunable Variable Delay Lines", IEEE vol. 61, no. 1, 1. Jan. 2013, pages 70-76, ISSN: 0018-926X
11. US patent application US 2009/073332 A1

Microwave components such as phase shift devices can be formed from microstrip lines. A microstrip line is a type of electrical planar transmission line which can be fabricated using printed circuit board technology. It consists of or comprises a conducting strip shaped electrode that is separated from a planar ground electrode by a dielectric layer known as the substrate.

As in [1, 3], the substrate can be formed by liquid crystal polymers (LCPs). However, the LCP material is not tunable with respect to the relative permittivity of this material. Therefore, due to the lack of tunable characteristic features that are relevant for the configuration of a tunable RF device, making use of LCPs is not convenient for designing of a tunable device such as a varactor.

Liquid crystals (LCs) exhibits features and properties of conventional liquids as well as of solid crystals. For instance, an LC may flow like a liquid, but its molecules may be orientated in a crystal-like way. In contrast to liquid crystal polymers (LCPs), the relative permittivity of liquid crystals (LCs) may be affected by e.g. a voltage applied to the LC material.

In prior art [6], coplanar waveguides (CPW) have been loaded with shunt LC varactors. The tuning speed of such an LC devices is affected by its topology. One of the known drawbacks of such devices is the high metallic loss of the CPW. Additionally, due to the CPW, the varactors were implemented by patches as floating electrodes bridging the center conductor and the ground plane. This results in reduced tuning efficiency and high insertion loss of such an artificial transmission line.

Similarly in [7], the tuning efficiency of the LC varactors is improved by using a parallel plate capacitor topology. However, there a slotline was loaded with these LC varactors in shunts. Indeed, loading a microstrip line results in higher performance because microstrip lines feature system-inherently low losses.

Therefore it is desirable to reduce disadvantages of phase shift devices according to prior art and to provide for a favorable phase shift device with low response time as well as with a high performance, that comprises both features simultaneously in a compact and planar configuration.

The invention relates, according to an aspect thereof, to a phase shift device that is formed by a signal electrode an a ground electrode which are separated by a dielectric substance, and further comprising a liquid crystal material, characterized in that the signal electrode of the planar transmission line is divided into several pieces and comprises overlapping areas of adjacent pieces that are filled with a tunable liquid crystal material, thereby forming a dielectric tunable component (varactor) with a metal-insulator-metal type capacitor.

A transmission line (microstrip line) is formed by two electrodes: A signal electrode and a ground electrode. The material of the electrodes is preferably low resistive RF electrode material such as Ag, Cu or Au. Other materials or alloys with similar conductive properties are possible. The signal electrode is divided into several pieces along the length, i.e. along the propagation direction. These pieces are e.g. implemented as top side pieces on the top side of bottom glass and as bottom side pieces on the bottom side of top glass. The top glass and the bottom glass are stacked in such a way that a in plan view, i.e. when viewed perpendicular to the propagation of the signal a continuous signal electrode is formed. The terms top glass and bottom glass do not indicate that other suitable materials are waived. Additionally, there are some sections where the top side pieces and the bottom side pieces of the signal electrode are overlapping. At least, these overlapping areas between the two glasses and the top side piece and the respective bottom side piece of the signal electrode are filled with a tunable liquid crystal material. Therefore, each overlapping area forms a metal-insulator-metal type capacitor. In this case, since the insulator is the tunable liquid crystal material, this area forms a dielectric tunable component (varactor). This tunable component enables to construct this phase shift device in a very compact way.

Due to LC technology, the varactors feature low losses compared to other technologies such as semiconductors for frequencies higher than 5 GHz preferably frequencies higher than 10 GHz. Additionally, since microstrip line is used, the phase shifter losses would be much less than compared to [6,7].

According to an embodiment of an aspect of the invention the several pieces of the signal electrode are arranged at two or more different distance levels with respect to the ground electrode. Arrangement of the several pieces of the signal electrode at two different levels allows for easy and cost-saving fabrication of such a device, as the two different levels can be on two surfaces of substrate layers. Three or more different distance levels allow for complex configurations and e.g. different layers of LC material that is located between two adjacent distance levels.

The tunable liquid crystal material can be arranged as a single and continuous layer between several pieces of the signal electrode that are arranged at two different distance levels. The boundaries of this continuous, i.e. unbroken layer can be adapted and limited to the shape and extension of the signal electrode that is defined as a composed covering of the several pieces. This continuous layer can completely cover the usually larger ground electrode. For many applications the continuous layer can be arranged between two adjacent layers of either electrodes or substrate layers and completely fill a cavity between those dielectric substrate layers. This allows for fast and cheap fabrication of such an arrangement e.g. by use of well-established liquid crystal display technology.

However, in order to save tunable liquid crystal material or to allow for separate control of confined spatial regions of the tunable liquid crystal material it is possible to arrange the tunable liquid crystal material as several confined layer areas between the overlapping areas of adjacent pieces of the signal electrode at two different distance levels.

For most applications arranging the pieces of the signal electrode parallel to the propagation direction, e.g. linearly along the propagation direction of a radio frequency signal is advantageous, since this prevents any discontinues, resulting in less losses. If required or feasible, the pieces of the signal electrode are arranged in a straight line.

However, for some applications that require many varactors along the transmission line, the transmission line may be meandered, e.g. in an N-shape or in spiral shape. This allows for a transmission line length that is much longer than the physical dimension of the phase shift device.

The phase shift along the transmission line is exclusively or at least predominantly due to the tunable varactors that are of the metal-insulator-metal capacitor type and that are arranged along the signal electrode. The configuration, shape and arrangement of the pieces of the signal electrode should not result in resonant structures that significantly affects the time delay for the signal propagation along the transmission line.

A phase shift device according to an embodiment of an aspect of the invention can be characterized in that the signal electrode is divided into several pieces along the length of the transmission line, whereby said several pieces are alternatingly implemented as top side pieces on the top side and as bottom side pieces on the bottom side of a non-tunable dielectric substrate and whereby at some sections there are overlapping areas between an top side piece and an adjacent bottom side piece of the signal electrode, and whereby these overlapping areas are filled with a tunable liquid crystal material and these overlapping areas form a dielectric tunable component (varactor) with a metal-insulator-metal type capacitor.

In a exemplary embodiment the non-tunable dielectric substrate that supports the several pieces of the signal electrode is chosen to be a 700 μm thick borofloat glass from Schott AG with $\varepsilon_{r,glass}$=4.6 and its loss tangent tan δ=0.0037 at 25° C. and at 1 MHz. A LC mixture is used, whose relative dielectric constant is continuously tunable between 2.4 and 3.2 by application of a tuning voltage and surface alignment method. The maximum dielectric loss tangent tan δ of this material is less than 0.006 for all tuning states. The LC layer (from metal to metal) is specified to 3 μm to obtain a fast response time that is less than 25 ms. The device provides for a 367° differential phase shift at 20 GHz with 6.1 dB insertion loss at maximum.

An important parameter for quantifying the RF performance of these devices is a frequency-dependent figure of merit (FoM). This is defined by the ratio of the maximum differential phase shift and the highest insertion loss over all tuning states.

Hence, the FoM of the exemplary embodiment is 60°/dB at 20 GHz.

In a further embodiment the planar transmission line comprises at least two serially connected dielectric tunable components that are connected by a non-overlapping section of the signal electrode. The signal transmission along the planar transmission line is dominantly and basically solely affected be the number and configuration of the varactors, i.e. the tunable dielectric components that are arranged along the signal electrode. The phase shift is easily controlled and modified by application of a tuning bias voltage to the tunable liquid crystal material that forms the tunable dielectric material between the overlapping areas of adjacent pieces of the signal electrode, i.e. the parallel plate like tunable capacitor that acts as the varactor.

The tuning is performed by control electrodes. These electrodes operate as control element. These electrodes transmit the different bias voltages to drive the varactors through bias lines. The bias lines are preferably made of a low conductive material in order not to affect the RF circuitry. For this purpose, low conductive electrodes can be used since they become transparent for the RF signal. Typical materials for the bias lines are preferably ITO (indium tin oxide), NiCr (nickel chromium) or some other alloys having a conductivity of less than 10e5 S/m.

In further embodiments the phase shift device is combined with a radiating element to transmit the RF signal. Often radiating element are also referred to as patch antennas. The radiating elements and the feed lines are usually photoetched on the dielectric substrate. The radiating elements, i.e. the patch antennas are configured as square, rectangular, thin strip (dipole), circular, elliptical, triangular, or any other formation.

In further embodiments the radiating element is an arbitrarily shaped microstrip patch antenna or a microstrip slot antenna.

Liquid crystals (LC) are suitable to realize tunable RF devices. LC can be employed as a tunable dielectric, specifically optimized LC mixtures offer high performance at microwave frequencies with a loss tangent below 0.006. The relative tunability, defined as the ratio of the tuning range of the minimum permittivity to the maximum permittivity, is preferably between 5% and 30% or between 10% and 25% or between 15% and 30% or between 5% and 14%.

LC based planar phase shift devices are usually customized depending on desired antenna performance. For this purpose the phase shift device is configured and adapted in order to reduce insertion loss, to increase beam steering speed and to allow for wide range scans. According to this invention, a LC mixture optimized for RF applications is used. A possibility to realize tunable RF components with LC is presented in FIG. 3. It shows the cross section of an inverted microstrip line using LC as a tunable substrate for different bias voltages. The setup consists of or comprises two stacked substrates, the top one carrying the microstrip line and the lower one the ground plane. In between the two substrates, a thin LC layer is encapsulated.

The phase shift device according to an aspect of the invention can be combined with a radiating element e.g. in order to provide for phased array antenna.

In a first embodiment of such a combination the planar transmission line and the antenna are coupled by using an aperture coupling method. In a second embodiment the planar transmission line and the antenna are coupled by using a proximity coupling method. In a third embodiment the planar transmission line and the antenna are coupled directly, e.g. using a inset-fed technique or through an vertical interconnect.

BRIEF DESCRIPTION OF THE DRAWINGS

The various objects and characteristics of aspects of the invention will emerge more clearly in the description which follows and which describes non-limiting embodiments of aspects of the invention, as well as in the attached figures which represent.

DETAILED DESCRIPTION

In general liquid crystal (LC) materials are anisotropic. This property stems from the rod-like shape of the molecules, as shown in an example structure of a typical LC molecule in FIG. 1. Here it is shown how the phase configuration of a LC material changes with increasing temperature. Together with the molecule in FIG. 1 the corresponding anisotropic dielectric properties are indicated. Since the material is liquid, the molecules feature only a weak molecular adhesion, and thus their orientation in the bulk can be changed. Owing to the rod-like shape, the molecules in a bulk tend to orient themselves in parallel order. The relative permittivity parallel to the molecule long axis is denoted as $\varepsilon_{r,\|}$ and perpendicular to the long axis as $\varepsilon_{r,\perp}$.

If such a liquid crystal material is arranged between a signal electrode and a ground electrode of a strip shaped transmission line, the transmission speed of a radio frequency signal along the transmission line will be affected by the permittivity of the liquid crystal material.

With these two permittivities $\varepsilon_{r,\|}$ and $\varepsilon_{r,\perp}$ the loss tangents $\tan \delta,\|$ and $\tan \delta,\perp$ for the signal transmission are associated.

An electric field can be generated e.g. by application of a control voltage to the liquid crystal material and will affect the orientation of the rod-like shaped liquid crystal molecules. Thus, by application of a predetermined control voltage the relative permittivity of the liquid crystal material can be controlled.

There are other tunable dielectric materials with similar properties, i.e. with a tunable relative permittivity that can be controlled and adjusted by application of an electric field. It will be well understood by a person skilled in the art that even though the following description focuses on tunable liquid crystal material, many different materials with tunable relative permittivity can be used for the purpose of this invention and are included.

Figure 2:
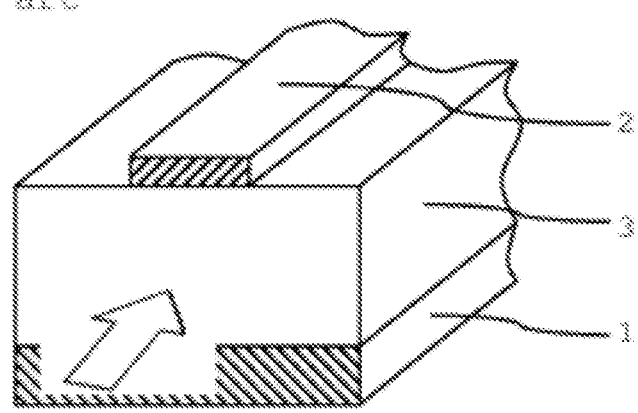

FIG. 2 shows a prior art planar transmission line formed as a microstrip line. It consists of or comprises a ground electrode 1 and a continuous, i.e. unbroken signal electrode 2 which are separated by a layer of a dielectric substrate 3. The propagation direction is along the direction of the signal electrode 2 and indicated by an arrow.

Figure 3A:
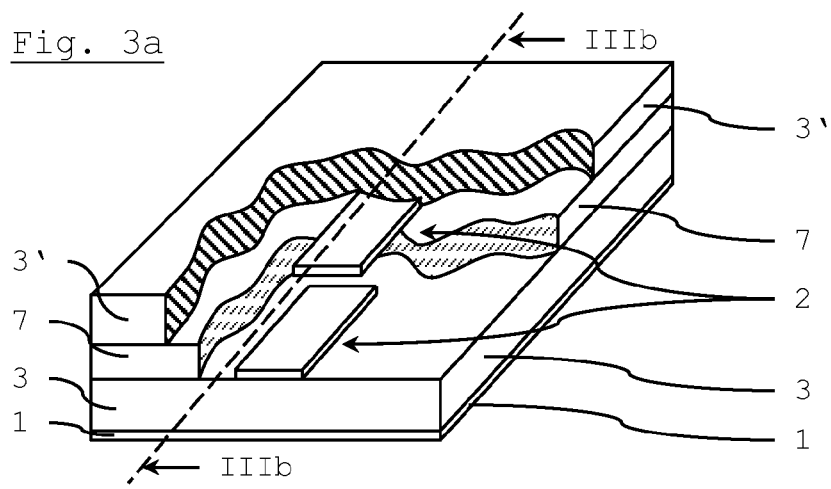
Figure 3B:
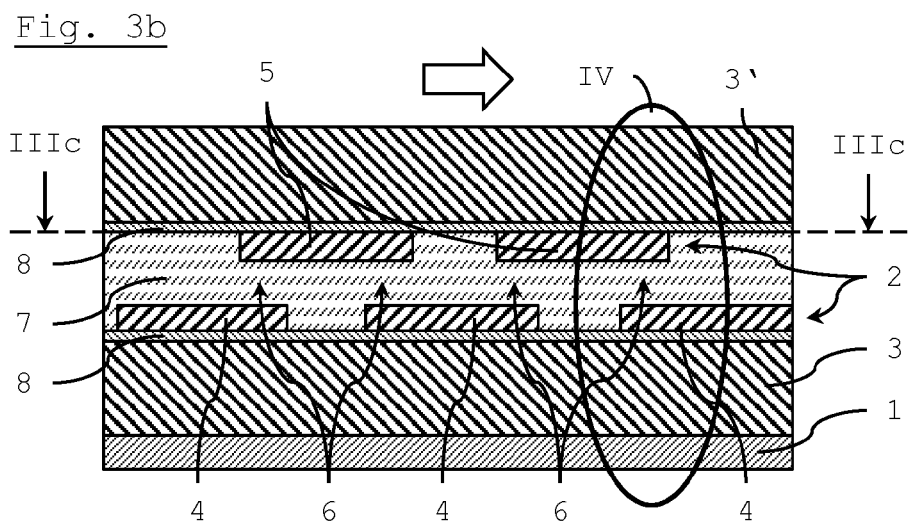
Figure 3C:
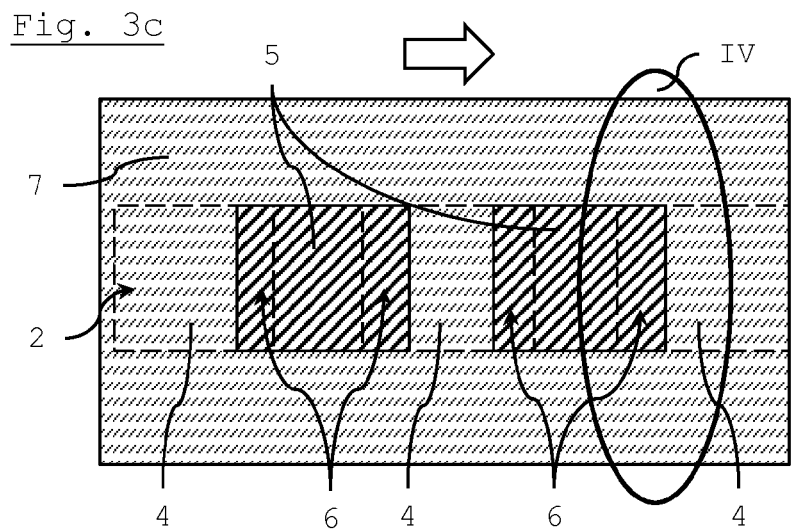

FIGS. 3a, 3b and 3c, respectively, show a perspective view, a cross-section view and a schematic representation of main components of a phase shift device line according to an aspect of the invention. It comprises a ground electrode 1 and a signal electrode 2 which form a planar transmission line. The signal electrode 2 is composed of several pieces 4 and 5 (both shown in FIGS. 3b and 3c) of low resistive RF electrode material that are arranged at two different distance levels perpendicular to and with respect to the ground electrode 1. The several pieces 4, 5 are aligned along the transmission line, i.e. the signal propagation path as defined by the direction of the signal electrode 2 and indicated by an arrow. The several pieces 4, 5 of the signal electrode 2 are arranged with respect to each other in order to create overlapping areas 6 of adjacent pieces 4, 5.

Between the ground and the signal electrode is a layer of the non-tunable dielectric substrate 3, preferably glass. The space between the several pieces 4, 5 of the signal electrode 2 is filled with a tunable liquid crystal material 7. Between each adjacent pieces 4, 5 there are overlapping areas 6. The pieces 4, 5 are stacked and arranged in such a manner that apparently a continuous signal electrode 2 is formed when viewed from the top view, i.e. perpendicular to the ground electrode 1. On top of the tunable liquid crystal 7 is a second layer 3' of a non-tunable dielectric substrate. The several pieces 4, 5 of the signal electrode 2 can be e.g. printed or coated or laminated onto the corresponding surfaces of the layers 3 and 3' of the non-tunable dielectric substrate.

The pieces 4, 5 of the signal electrode 2 are connected with control elements 8 (only shown in FIGS. 3b and 3c) that consist of or comprise a low conductive material, preferably ITO (indium tin oxide), which is transparent for RF. These control elements 8 transmit the bias voltage that can be applied in order to tune the liquid crystal material 7 in the overlapping areas 6, i.e. in order to modify the relative permittivity of the liquid crystal material 7 that is between the overlapping areas 6 of adjacent pieces 4, 5 of the signal electrode 2 which affects the transmission properties of a RF signal that is transmitted along the planar transmission line.

The time delay of signal transmission along the planar transmission line, i.e. the phase shift of a signal that is transmitted along the transmission line of the phase shift device according to an aspect of the invention is generated by the successive time delays for each signal jump between the adjacent pieces 4, 5 of the signal electrode 2 that are arranged at different distance levels with respect to the ground electrode 1.

Contrary to the phase shift devices of prior art that comprise a layer of tunable LC material between the ground electrode 1 and the microstrip like signal electrode 2 (e.g. similar to FIG. 2), the total time delay mainly depends on the number of signal jumps during the propagation of the signal along the planar transmission line. Each single jump causes a certain time delay that can be modified by tuning the tunable liquid crystal material 7 at the corresponding overlapping area 6. The total time delay is the small time delay of a single jump multiplied by the number of jumps along the planar transmission line.

Figure 3D:
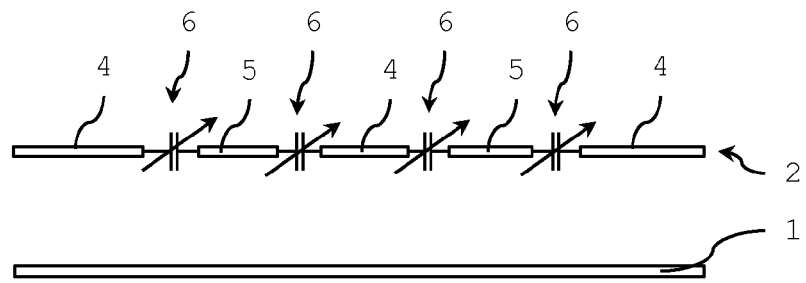

Accordingly, the planar transmission line of the phase shift device according to an aspect of the invention comprises at least two but preferably many serially connected dielectric tunable components (varactors) that are connected by a non-overlapping section of the signal electrode 2. A schematic representation of the planar transmission line is shown in FIG. 3d.

Figure 4A:
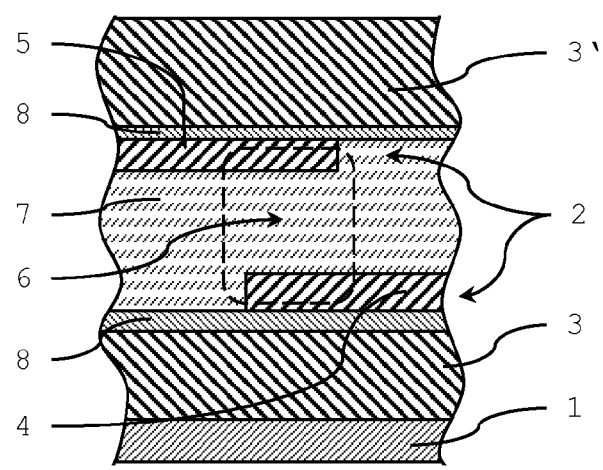
Figure 4B:
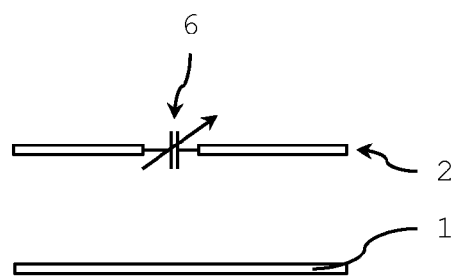

FIGS. 4a and 4b show a more detailed cross-section view and a corresponding schematic representation of a single varactor configuration, i.e. the overlapping area 6 between two adjacent pieces 4, 5 of the signal electrode 2 and the ground electrode 1 in the phase shift device as shown in FIGS. 3a to 3d.

Figure 5:
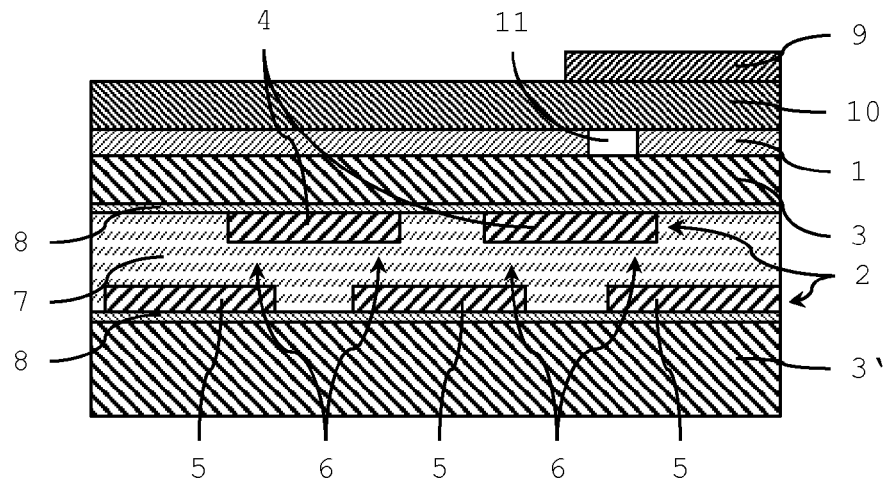
Figure 6:
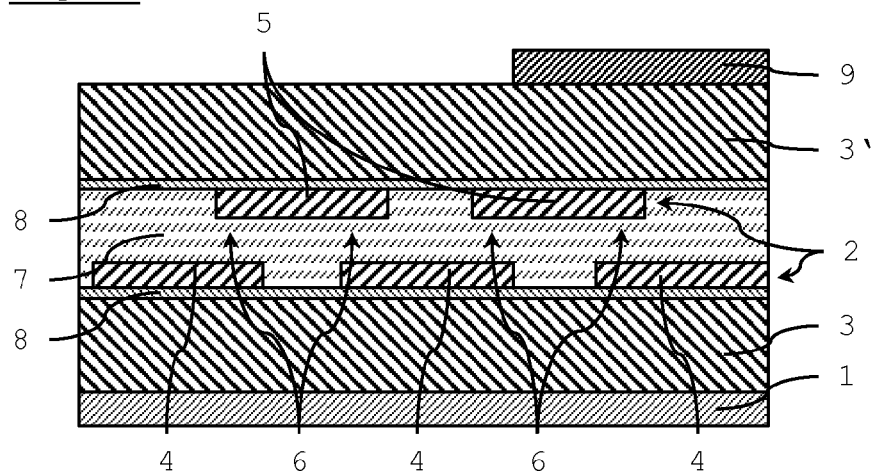
Figure 7:
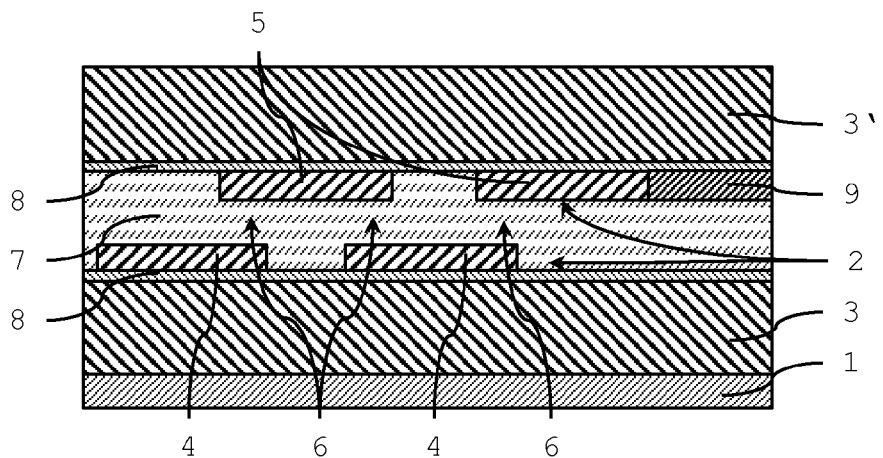

FIGS. 5, 6 and 7 show different embodiments for a radiation element comprising a phase shift device according to FIGS. 3a to 3d that is coupled with an antenna patch 9.

In FIG. 5 the several pieces 4, 5 of the signal electrode 2 of the planar transmission line and the antenna patch 9 are coupled by using an aperture coupling method. For such a coupling the antenna patch 9 is separated from the ground electrode 1 by a layer 10 of a non-tunable dielectric substrate. The energy that is transmitted along the transmission line, i.e. along the signal electrode 2 and ground electrode 1 is coupled to the antenna patch 9 through a nearby slot 11 within the ground electrode 1.

In FIG. 6 the planar transmission line and the antenna patch 9 are coupled by using a proximity coupling method.

In FIG. 7 the planar transmission line and the antenna patch 9 are coupled by using an insert feed coupling method.

Figure 8:
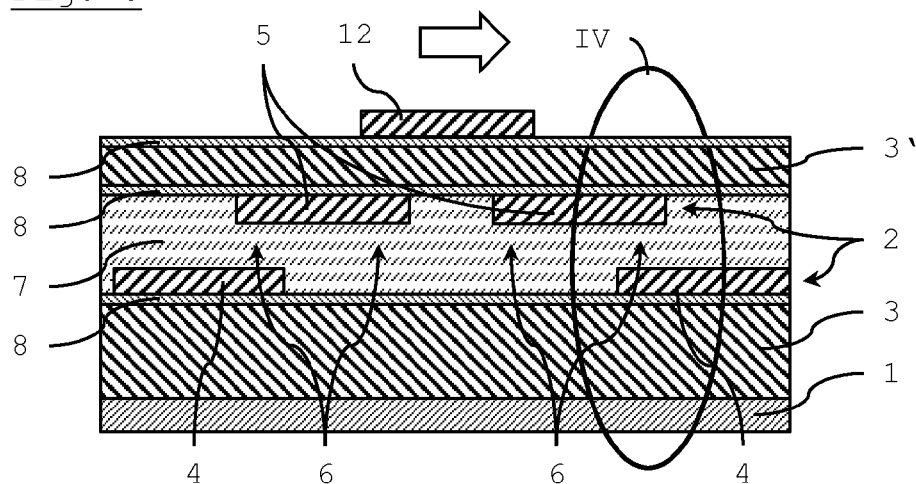

FIG. 8 shows a different embodiment of the phase shift device according to an aspect of the invention. Other than previously described, in addition to the several pieces 4, 5 of the signal electrode 2 that are arranged at two different distance levels, some additional pieces 12 of the several pieces 4, 5 and 12 are arranged at a third distance level with respect to the ground electrode 1. The additional pieces 12 are mounted on another surface of the layer 3' of the non-tunable dielectric substrate that is opposed to the surface on which the pieces 5 of the second distance level are mounted.

With the exemplary embodiment of FIG. 8, the time delay for a signal jump between the additional pieces 12 and the adjacent pieces 5 cannot be modified, as the layer 3' that separates the second distance level with pieces 5 from the third distance level with additional pieces 5 is made of a non-tunable dielectric substrate. Hence there is no dielectric tunable varactor wherever an overlapping area 6 exist between pieces 5 and additional pieces 12. Therefore, in order to be able to tune the phase shift it might be advantageous to achieve an overlapping area between 12 and 4. Nevertheless, the additional signal jumps will add a fixed time delay that only depends on the number of these signal jumps, resulting in e.g. an offset that can be manufactured in a very cost-saving manner.

In yet another embodiment of the phase shift device that differs from the one shown in FIG. 8, the sequence of overlapping pieces at three different distance levels may differ and e.g. a first piece 4 on the lowest distance level may overlap with a subsequent piece 12 on the highest distance level, followed by another piece on the middle distance level. The RF signal then jumps from the lowest distance level to the highest distance level and subsequently to a middle level and back to the lowest level. It will be understood that the respective signal jumps that each cause a certain time delay can be predetermined and arranged in many different ways, resulting in the total phase shift of the signal. A skilled person in art can also electrically connect some pieces on different distance levels through vertical interconnects as well.

It is also possible to add a second layer of a tunable dielectric material between the several pieces 4, 5 and the additional pieces 12 of the signal electrode 2. Such a second layer may consist of or comprise a completely different tunable dielectric material or of the same liquid crystal material that is used for the first layer of the tunable liquid crystal material 7. Even when the second layer equals the first layer of liquid crystal material 7, by use of different control elements or by application of a different bias voltage the time delay for signals jumps between the second and the third distance level may by controlled differently and result in many more possibilities for controlling the phase shift device and the resulting phase shift.

It is also possible to arrange the several pieces 4, 5, and 12 of the signal electrode 2 at more than two or three distance levels with respect to the ground electrode 1.

Figure 9A:
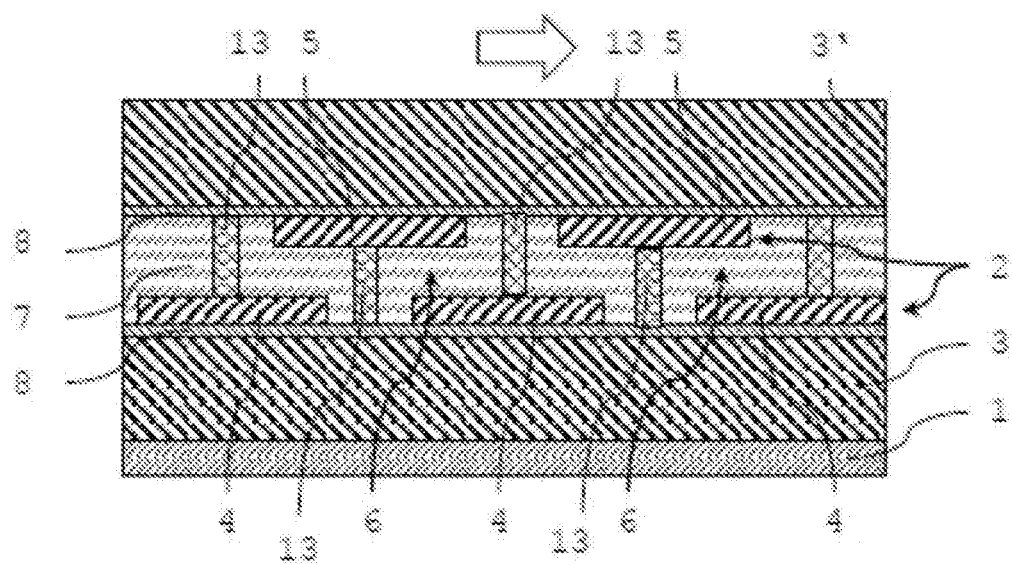
FIG. 9a is a cross-sectional view of an embodiment of the phase shift device wherein tunable dielectric material is arranged as at least several confined layer areas between overlapping areas of adjacent pieces of a signal electrode at two different distance levels.

In an embodiment shown in FIG. 9a, the tunable dielectric material 7 is arranged as at least several confined layer areas between the overlapping areas 6 of adjacent pieces 4, 5 of the signal electrode 2 at two different distance levels. The tunable dielectric material 7 is arranged as several confined layer areas whereby the confined layer areas are arranged along the planar transmission line and can be separated by separator elements 13 that confine the tunable dielectric material but do not significantly affect the signal propagation along the signal propagation path that is indicated by the arrow.

Figure 9B:
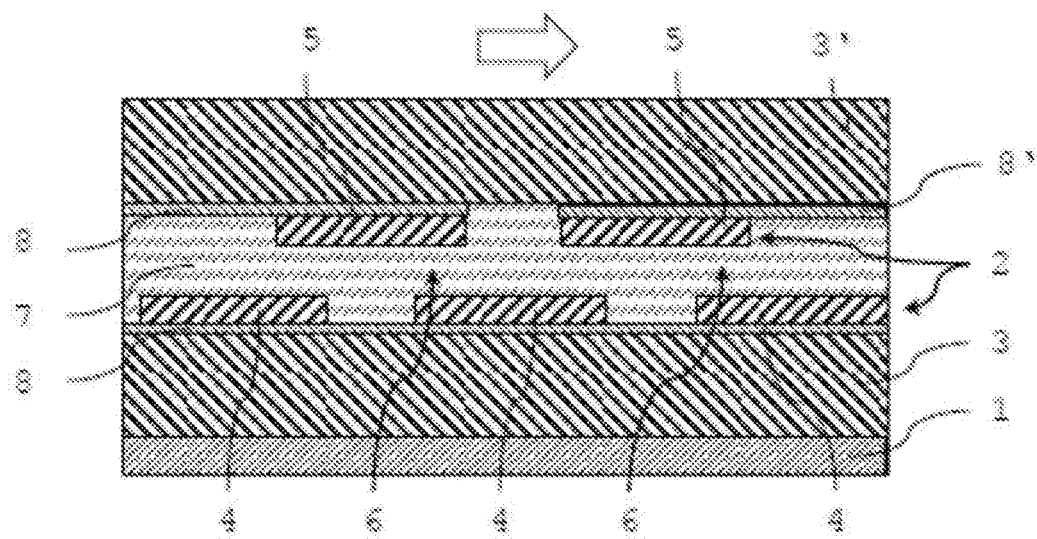
FIG. 9b is a cross-sectional view of an embodiment of the phase shift device wherein a planar transmission line comprises at least two serially connected dielectric tunable components that are connected by a non-overlapping section of a signal electrode.

In an embodiment shown in FIG. 9b, the planar transmission line comprises at least two serially connected dielectric tunable components that are connected by a non-overlapping section of the signal electrode 2. The control electrode 8 is separated in the middle resulting in a left part of the phase shift device with control electrode 8 and a right part of the phase shift device with control electrode 8'. The control electrodes 8 and 8' can be operated individually and without affecting the other control electrode 8' and 8, thus providing for two serially connected dielectric tunable components (left side and right side) that are connected by a non-overlapping section of the signal electrode (the lower middle section in FIG. 9b).

Figure 1:
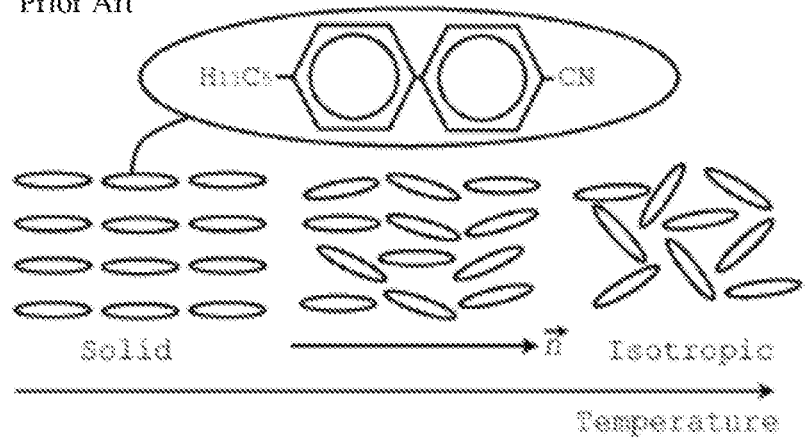
FIG. 1, a schematic view of a typical LC molecule and its temperature dependency FIG. 2, a schematic view of a planar transmission line according to prior art FIGS. 3a, 3b, 3c, and 3d, a schematic perspective view, a cross-sectional view and a topside view of a phase shift device with several LC varactors according to an aspect of the invention and a schematic representation of tunable LC varactors that are arranged within the signal electrode of the phase shift device, FIGS. 4a and 4b respectively show a cross-sectional enlarged view of a single overlapping area of adjacent pieces of the signal electrode within the phase shift device according to FIGS. 3a to 3d, and a schematic representation of the LC varactor shown in FIG. 4a, FIG. 5, a schematic cross-section view of a first embodiment of the phase shift device with a coupled antenna, FIG. 6, a schematic cross-section view of a second embodiment of the phase shift device with a coupled antenna, FIG. 7, a schematic cross-section view of a third embodiment of the phase shift device with a coupled antenna, and FIG. 8, a schematic cross-section view of a different configuration of the phase shift device according to FIGS. 3a to 3d, whereby the several pieces of the signal electrode are arranged on three different distance levels with respect to the ground electrode.

REFERENCES IN THE FIGURES 1 ground, electrode
2 signal electrode
3 layer of non-tunable dielectric substrate
4 pieces of signal electrode 2 at lower distance level
5 pieces of signal electrode 2 at higher distance level
6 overlapping area
7 tunable liquid crystal material
8 control element
9 antenna patch
10 layer of non-tunable dielectric substrate
11 slot
12 additional pieces of signal electrode 2

The invention claimed is:

1. A phase shift device comprising a planar transmission line that is formed by a signal electrode and a ground electrode which are separated by a dielectric substance, and further comprising a tunable dielectric material, wherein the signal electrode of the planar transmission line is divided into several pieces and comprises overlapping areas of adjacent pieces, wherein the overlapping areas of adjacent pieces of the signal electrode of the planar transmission line are filled with the tunable dielectric b material, the signal electrode and the tunable dielectric material thereby forming a varactor comprising a dielectric tunable component with a metal-insulator-metal type capacitor, wherein the planar transmission line comprises at least two serially connected dielectric tunable components that are connected by a non-overlapping section of the signal electrode.

2. The phase shift device according to claim 1, wherein the tunable dielectric material is a liquid crystal material.

3. The phase shift device according to claim 1, wherein the several pieces of the signal electrode are arranged at two or more different distance levels with respect to the ground electrode.

4. The phase shift device according to claim 3, wherein the tunable dielectric material is arranged as a single and continuous layer between the several pieces of the signal electrode that are arranged at the two or more different distance levels.

5. The phase shift device according to claim 3, wherein the tunable dielectric material is arranged as at least several confined layer areas between the overlapping areas of adjacent pieces of the signal electrode at the two or more different distance levels.

6. The phase shift device according to claim 1, wherein the several pieces of the signal electrode are linearly arranged along a propagation direction of a radio frequency signal.

7. The phase shift device according to claim 1, wherein the several pieces of the signal electrode are arranged in a straight line.

8. The phase shift device according to claim 1, wherein the dielectric substance comprises a non-tunable dielectric substrate and the signal electrode is divided into the several pieces along a length of the transmission line, whereby the several pieces are alternatingly implemented as top side pieces on a top side and as bottom side pieces on a bottom side of the non-tunable dielectric substrate and whereby at at least two sections there are overlapping areas between a top side piece and an adjacent bottom side piece of the signal electrode, and whereby these overlapping areas are filled with the tunable liquid crystal material forming the tunable dielectric material.

9. The phase shift device according to claim 1, wherein the tunable dielectric material comprises a liquid crystal material with tunability of relative permittivity, defined as the ratio of a tuning range of the permittivity to the maximum permittivity between 5% and 30%.

10. The Phase shift device according to claim 1, wherein the phase shift device comprises at least one control element that is connected with at least one of the pieces of the signal electrode and that transmits a bias voltage in order to tune the liquid crystal material in the overlapping areas.

11. The phase shift device according to claim 10, wherein the at least one control element consists of ITO (indium-tin-oxide).

12. The phase shift device according to claim 1, wherein the planar transmission line is coupled with a radiating element.

13. The phase shift device according to claim 12, wherein the radiating element is an arbitrary shaped microstrip patch antenna or microstrip slot antenna.

14. The phase shift device according to claim 12, wherein the planar transmission line and the radiating element are coupled by using an aperture coupling method.

15. The phase shift device according to claim 12, wherein the planar transmission line and the radiating element are coupled by using a proximity coupling method.

16. The phase shift device according to claim 12, wherein the planar transmission line and the radiating element are connected directly by one of using an inset-fed technique or through a vertical interconnect.

* * * * *